United States Patent [19]

Yabe et al.

[11] Patent Number: 4,718,307
[45] Date of Patent: Jan. 12, 1988

[54] TRANSMISSION REMOTE CONTROL APPARATUS

[75] Inventors: Hideo Yabe, Hiki; Akimitsu Ebina, Higashimatsuyama, both of Japan

[73] Assignee: Jidosha Kiki Co., Ltd., Tokyo, Japan

[21] Appl. No.: 20,151

[22] Filed: Feb. 25, 1987

Related U.S. Application Data

[63] Continuation of Ser. No. 711,709, Mar. 13, 1985, abandoned.

[30] Foreign Application Priority Data

Mar. 30, 1984 [JP] Japan .................................. 59-61202

[51] Int. Cl.$^4$ .............................................. B60K 41/06
[52] U.S. Cl. ......................................... 74/866; 74/335; 74/878; 364/424.1
[58] Field of Search ...................... 74/866, 878, 752 A, 74/752 D, 335, 336 R, 473 R, 850; 340/53 F; 123/179 K; 364/424.1, 431.09, 431.1, 431.11

[56] References Cited

U.S. PATENT DOCUMENTS

| | | | |
|---|---|---|---|
| 3,722,933 | 11/1973 | Prenzel et al. | 74/752 A X |
| 3,808,738 | 5/1974 | Siebers et al. | 74/866 X |
| 4,271,402 | 6/1981 | Kastura et al. | 340/52 F |
| 4,271,728 | 6/1981 | Wakamatsu | 74/850 X |
| 4,355,549 | 10/1982 | Reinhard et al. | 123/179 K X |
| 4,363,249 | 12/1982 | Stugart | 74/850 |
| 4,438,422 | 3/1984 | Nojiri et al. | 340/52 F |
| 4,449,495 | 5/1984 | Fiala | 123/179 K X |
| 4,469,207 | 9/1984 | Sandel et al. | 74/473 R X |
| 4,513,276 | 4/1985 | Kubota et al. | 74/850 |
| 4,519,294 | 5/1985 | Hemens | 74/473 R X |
| 4,621,328 | 11/1986 | Arai et al. | 364/424.1 X |

FOREIGN PATENT DOCUMENTS

| | | | |
|---|---|---|---|
| 3313803 | 11/1983 | Fed. Rep. of Germany | 364/424.1 |
| 2058967 | 4/1981 | United Kingdom | 364/424.1 |

Primary Examiner—Leslie Braun
Assistant Examiner—Dwight G. Diehl
Attorney, Agent, or Firm—Townsend & Townsend

[57] ABSTRACT

A transmission remote control apparatus with a plurality of gear shift positions so as to shift a gear shift lever between gears through corresponding neutral positions has a diagnosis unit which has: a drive circuit for sequentially moving the gear shift lever in all neutral positions; a detector for detecting that the gear shift lever has passed all the neutral positions; an alarm generator for generating an alarm when a failure is detected; and a controller for controlling the drive circuit, the detector and the alarm generator.

4 Claims, 5 Drawing Figures

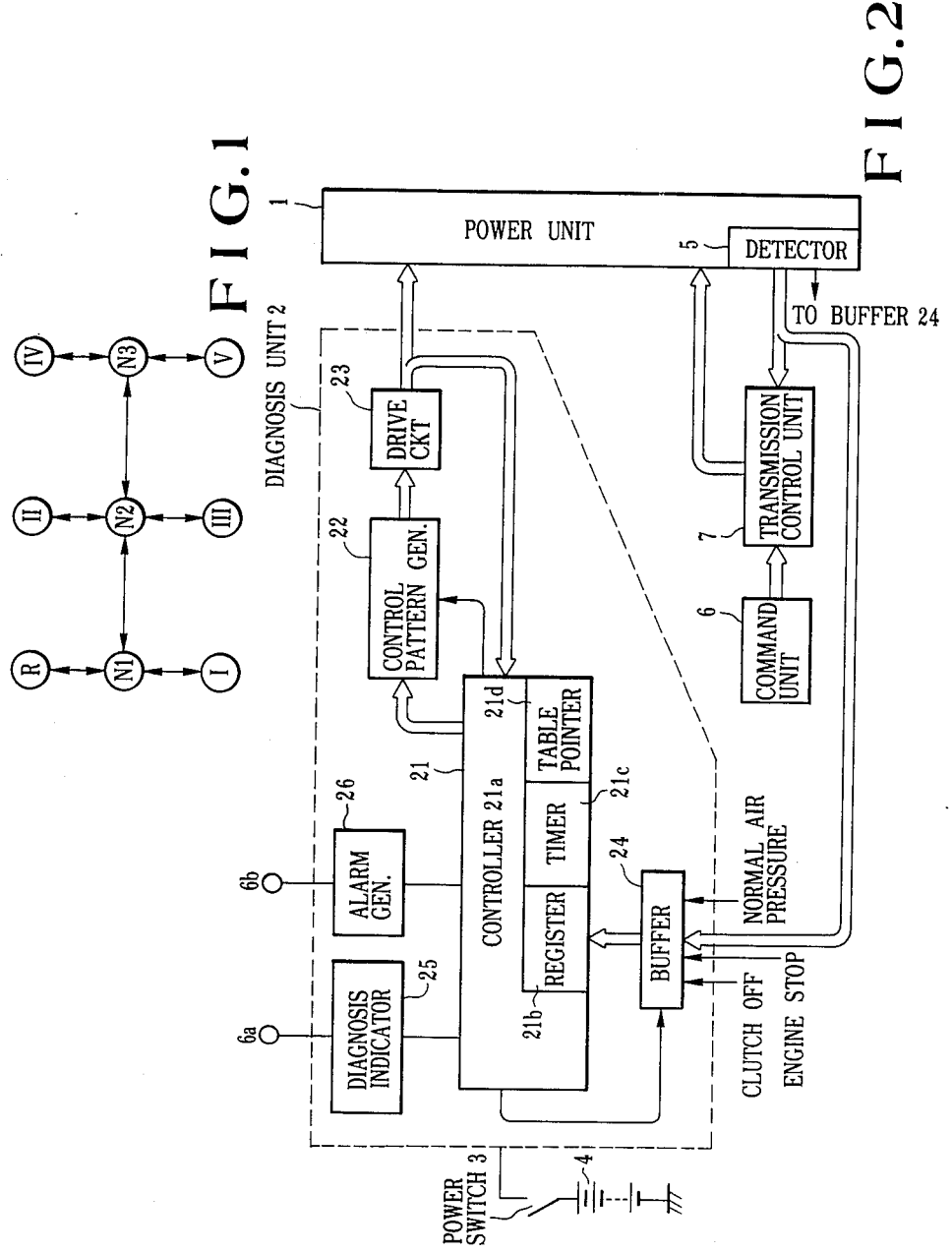

TRANSMISSION REMOTE CONTROL APPARATUS

This is a continuation of application Ser. No. 711,709, filed 3-13-85, now abandoned.

BACKGROUND OF THE INVENTION

The present invention relates to a transmission remote control apparatus for performing remote control of a transmission of a large bus or the like.

A transmission of a large bus is controlled by a long gear shift lever extending from a floor. The transmission must be synchronized with a long link mechanism arranged at the rear portion of the vehicle body. For this reason, experience and skill are required to shift between the gears in the transmission. Furthermore, a large force is required to shift between the gears. A conventional remote control system is proposed wherein electromagnetic valves are controlled in accordance with movement of the gear shift lever so as to cause the valves to open/close a compressed air path.

However, when an ignition key is being turned, the transmission must be set in the neutral position so as to guarantee starting of the engine and traffic safety. The conventional remote controlled transmission cannot automatically detect the neutral position in accordance with only the position of the gear shift lever. Various devices have been proposed to detect the neutral position. However, ultimately it is the driver who must detect the neutral position, resulting in inconvenience.

SUMMARY OF THE INVENTION

It is, therefore, a principal object of the present invention to provide a transmission remote control apparatus for automatically detecting a neutral position of a transmission.

In order to achieve the above object of the present invention, there is provided a transmission remote control apparatus having a plurality of neutral positions, wherein a normal transmission mode signal is generated when the apparatus detects that the transmission can be set in any neutral position.

The above and other objects, features and advantages of the present invention will be apparent from the detailed description in conjunction with the accompanying drawings.

BRIEF DESCRIPTION OF THE DRAWINGS

FIG. 1 a diagram showing gear shift lever positions in a transmission;

FIG. 2 is a transmission remote control apparatus according to an embodiment of the present invention;

DESCRIPTION OF THE PREFERRED EMBODIMENT

Figure 3:
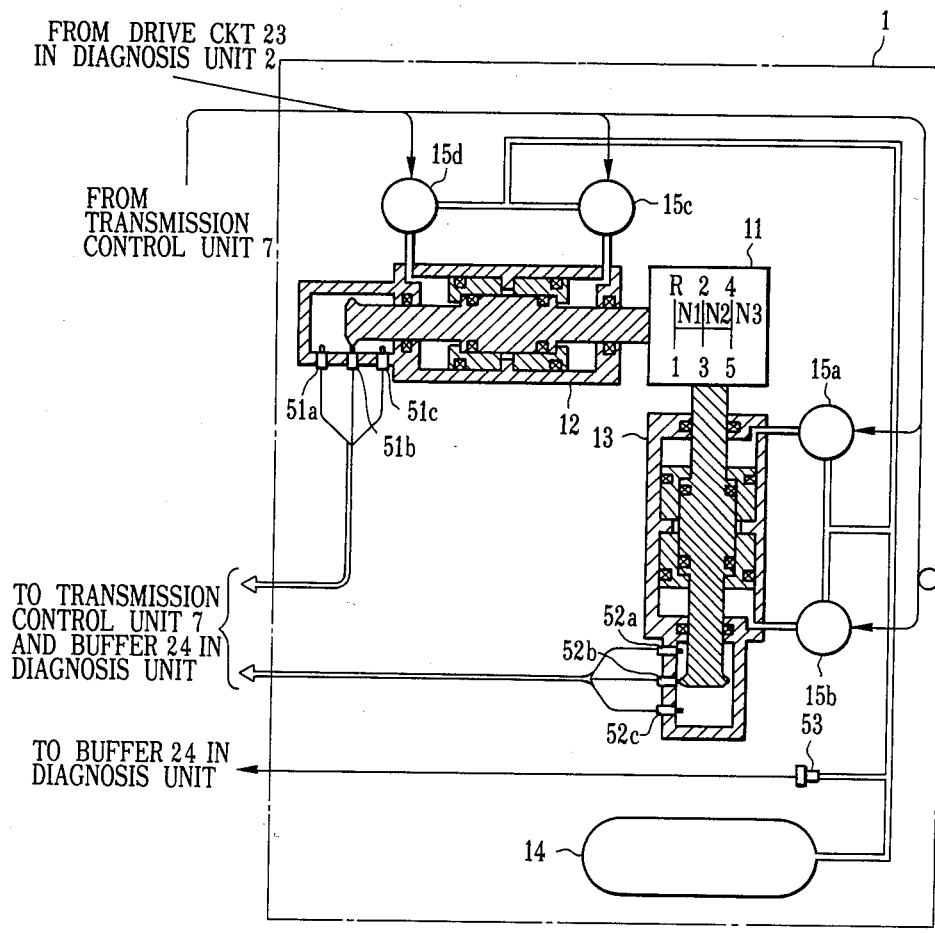
FIG. 3 is a schematic view showing the construction of a power unit shown in FIG. 2.

In order to best understand the present invention, the principle thereof will be briefly described before a preferred embodiment. FIG. 1 is a diagram showing the gear shift lever positions. Referring to FIG. 1, reference symbol R denotes a reverse gear position; I to V, first to fifth speed gear positions; and N1 to N3, neutral positions. When the gear shift lever is shifted as shown in FIG. 1, the lever must pass through the neutral positions. Based upon this assumption according to the present invention, the lever is controlled to be sequentially set in the neutral positions N1 to N3 before the engine is started. A diagnosis unit detects that the above operation is properly performed.

The preferred embodiment of the present invention will be described in more detail with reference to the accompanying drawings.

FIG. 2 is a block diagram of a transmission remote control apparatus according to an embodiment of the present invention. Referring to FIG. 2, reference numeral 1 denotes a power unit including a transmission; 2, a diagnosis unit; 3, a power switch; 4, a battery; 5, a detector for detecting an operating state of the power unit 1; 6, a command unit for indicating to an operator when to shift the gears in the transmission; and 7, a known transmission control unit for controlling a transmission position in response to a signal supplied from the command unit.

The diagnosis unit 2 comprises a CPU 21 for generating a signal in accordance with a test order, a control pattern generator 22 for generating an output image, i.e., a signal for testing the power unit 1 in response to a command supplied from the CPU 21, a drive circuit 23, a buffer 24, a diagnosis indicator 25 and an alarm generator 26. The CPU 21 comprises a controller 21a for controlling the overall operation of the apparatus, a register 21b, a timer 21c and a table pointer 21d.

The power unit 1 sets the transmission in a position represented by the signal supplied from the diagnosis unit 2 or the transmission control unit 7. A signal representing a designated lever position is generated from the detector 5 in the power unit 1.

The operation of the apparatus having the arrangement described above will be described hereinafter. When the power switch 3 is turned on, the diagnosis unit is powered or rendered operative. The controller 21a in the CPU 21 sends a signal fetch command to the buffer 24 to detect that an air pressure of the power apparatus 1 is normal, that the engine is stopped, and that the transmission is set in the neutral position. When any failure is detected, the diagnosis indicator 25 and the alarm generator 26 are turned on. In this case, the diagnosis indicator 25 is kept continuously on, and the alarm generator 26 generates an alarm sound. However, if no failure is detected, the diagnosis indicator 25 flashes.

When no failure is detected in the initialization test, the controller 21a sequentially supplies commands to the control pattern generator 22 to test the transmission in accordance with a predetermined order. The control pattern generator 22 decodes the signals received from the controller 21a and generates signals through the drive circuit 23 so as to test the power unit 1.

The transmission is supposed to be set in the neutral position. However, in order to guarantee that the transmission is set in the neutral position, the controller 21a supplies a command to the transmission so as to set the gear shift lever in the nearest neutral position. The control pattern generator 22 supplies a signal to set the transmission in the power unit 1 at the neutral position near one of the first to fifth speed gear positions. For example, even if the shift lever is set in the neutral position N3 at the beginning of the diagnosis operation, the shift lever is controlled again to be set in this neutral position N3. The detector 5 supplies to the diagnosis unit 2 a neutral position signal (in the above case, the signal corresponding to the position N3) representing which one of the neutral positions N1 to N3 corresponds to the current position of the lever. The neutral position signal is fetched by the register 21b through the buffer 24. The controller 21a checks whether or not the fetched signal corresponds to the command previously sent out.

When the first diagnosis is completed, the controller 21a generates a command for controlling the power unit 1 to set the shift lever in the neutral position N1 and receives a signal generated from the detector 5. Subsequently, the controller 21a checks whether or not the power unit 1 has properly set the shift lever in the neutral position N1. When the diagnosis of the neutral position N1 is completed, diagnosis operations for the neutral positions N2 and N3 are performed. When the power unit 1 is detected to be normal at all the neutral positions, the controller 21a detects that the shift lever of the transmission of the power unit 1 has passed through all the neutral positions. In this state, the diagnosis indicator 25 is turned off, and the alarm indicating the end of diagnosis is generated.

The operation cycle is performed such that a count of the table pointer 21d is incremented every time the output image for the command generated from the controller 21a coincides with the input image received from the buffer 24, and is completed when the count reaches a predetermined value. A count interval of the table pointer 21d is controlled by the timer 21c. Only when the diagnosis unit detects that the transmission is normal, the subsequent operation can be performed, e.g., the engine can be started.

As shown in detail in FIG. 3, the power unit 1 comprises a transmission 11, a select cylinder 12 for moving gears of the transmission 11 laterally, i.e., toward the neutral positions N1, N2 and N3, a shift cylinder 13 for shifting the gears of the transmission 11 vertically, i.e., toward the first to fifth speed gears, an air reservoir 14 for storing compressed air, electromagnetic valves 15a, 15b, 15c and 15d, select position sensors 51a, 51b and 51c for generating signals representing the lateral positions of the gears in the transmission 11, shift position sensors 52a, 52b and 52c for generating signals representing the longitudinal positions of the gears in the transmission 11, and an air pressure sensor 53 for detecting the pressure of compressed air. It should be noted that the select position sensors 51a, 51b and 51c, the shift position sensors 52a, 52b and 52c and the air pressure sensor 53 constitute the detector 5.

Figure 4A:
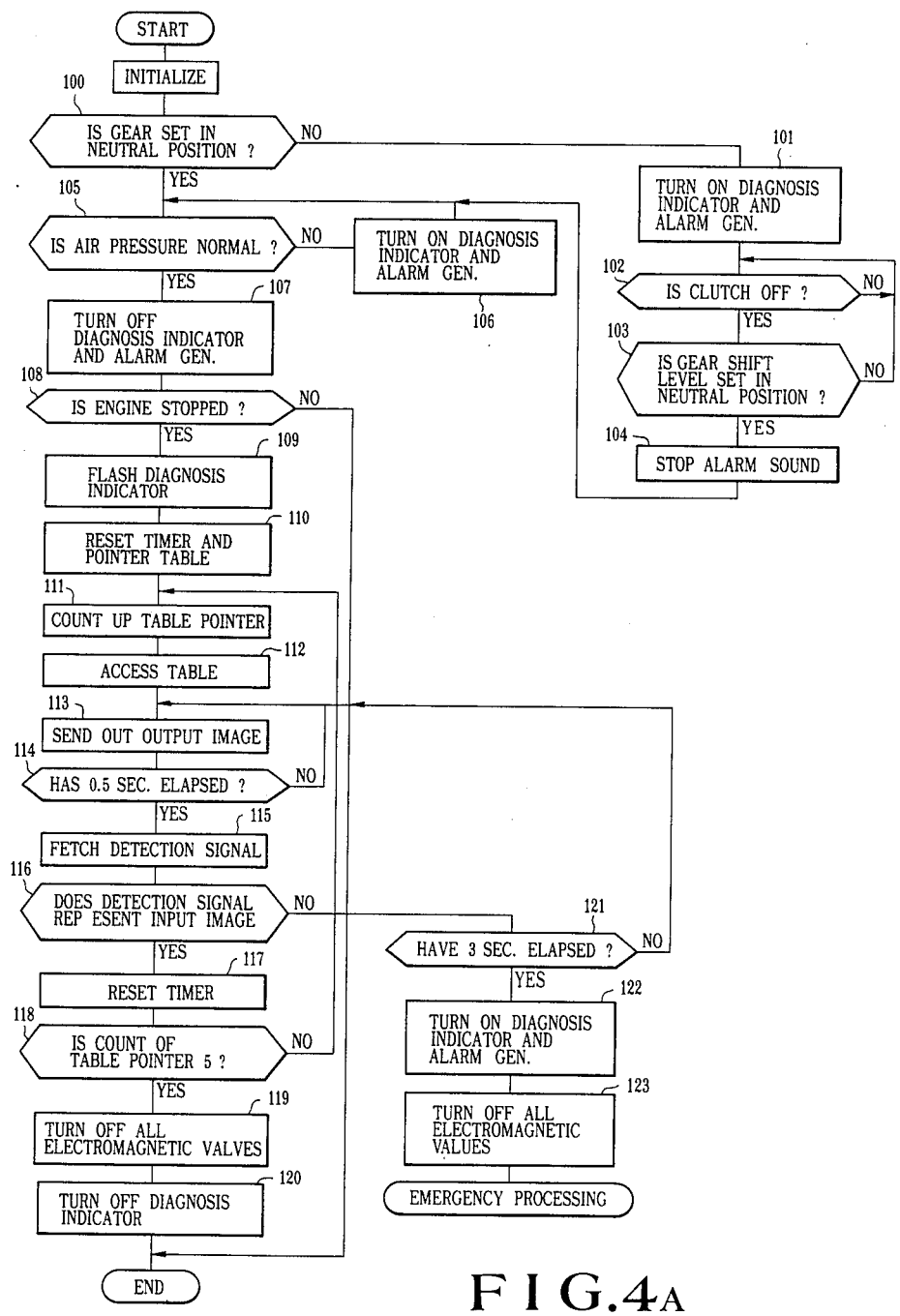
FIGS. 4a and 4b are flow charts for explaining the operation of the apparatus shown in FIG. 2.

FIG. 4 is a flow chart for explaining the operation of the apparatus shown in FIG. 2. Referring to FIG. 4, when the power switch is turned on, system initialization is performed. In step 100 of FIG. 4A, it is checked if the shift lever is in the neutral position. If NO in step 100, the diagnosis indicator 25 and the alarm generator 26 are turned on in step 101. By this alarm, the driver is alerted that a failure has occurred. The driver disengages the clutch and shifts the gear shift lever to the neutral position in steps 102 and 103. The diagnosis indicator 25 and the alarm generator 26 are turned off in step 104, and the flow advances to step 105. However, if YES in step 100, the flow directly advances to step 105. The controller 21a checks in step 105 whether or not the air pressure is normal. If NO in step 105, the diagnosis indicator 25 and the alarm generator 26 are turned on in step 106. However, if YES in step 105, the diagnosis indicator 25 and the alarm generator 26 are turned off. Thereafter, the controller 21a checks in step 107 whether or not the engine is stopped. If YES in step 108, the diagnosis indicator 25 flashes in step 109, thereby indicating that the diagnosis is being performed.

Figure 4B:
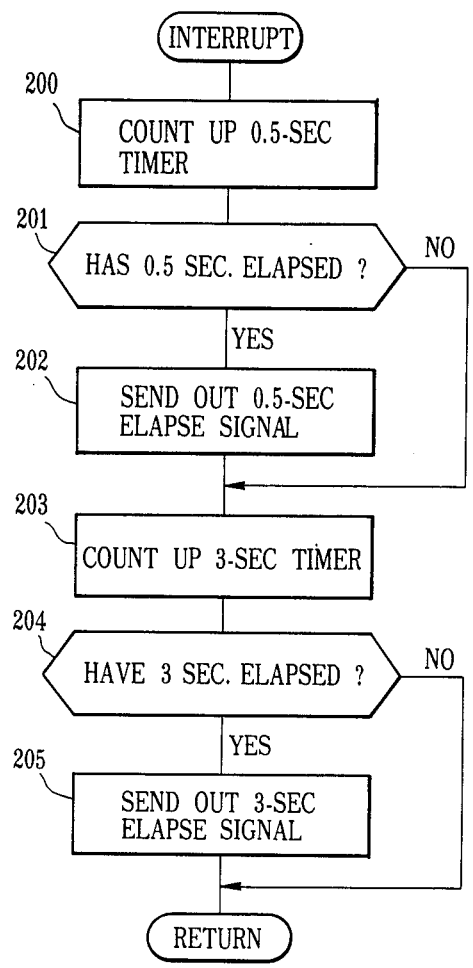

For each predetermined timing, the interrupt processing shown in FIG. 4B is performed. In steps 200 to 205, a 0.5-sec timer is counted up, and a 3-sec elapse signal is generated. The flow returns to the step at which an interrupt was generated. In step 110, the timer and the table pointer are reset. In step 111, the count of the table pointer is counted up. The table is then accessed in step 112.

For the first cycle, the count of the table pointer is set to "1". In step 113, the diagnosis unit 2 generates an output image signal for energizing the electromagnetic valves 15a and 15b and deenergizing the electromagnetic valves 15c and 15d in accordance with the gear neutral position output image read out based upon the reference in Table 1. The transmission 11 is set in any one of the neutral positions N1 to N3. As a result, the shift position sensor 52b is turned on, and a signal is supplied from the detector 5 to the diagnosis unit 2.

After the diagnosis unit 2 detects that the period of 0.5 sec has elapsed in step 114, the diagnosis unit 2 receives the signal from the power unit 1 in step 115. The controller 21a checks in step 116 whether or not the received detection signal coincides with the input image shown in Table 1.

TABLE 1

| | Electro-magnetic Valve/Sensor | Gear Position of Transmission (Table Pointer) | | | |
|---|---|---|---|---|---|
| | | Neutral (1) | N1 (2) | N2 (3) | N3 (4) |
| Output Image | 15a | ON | ON | ON | ON |
| | 15b | ON | ON | ON | ON |
| | 15c | OFF | ON | ON | OFF |
| | 15d | OFF | OFF | ON | ON |
| Input Image | 51a | | ON | OFF | OFF |
| | 51b | | OFF | ON | OFF |
| | 51c | | OFF | OFF | ON |
| | 52b | ON | ON | ON | ON |

If YES in step 116, the diagnosis unit 2 resets the 0.5- and 3-sec timers in step 117. The diagnosis unit 2 then checks in step 118 whether or not the count of the table pointer is "5". Since the count of the pointer is "1" for the first cycle, step 118 is determined to be "NO", and the flow returns to step 111. The table pointer is counted up, and the operations in steps 111 to 118 are repeated until the count of the table pointer reaches "5". For this reason, it can be checked whether or not the gear is controlled in all neutral positions N1 to N3.

When YES in step 118 while the operations in steps 111 to 118 are being repeated, all the electromagnetic valves are turned off in step 119, and the diagnosis indicator 25 is turned off in step 120. When the diagnosis operation is completed, normal transmission control can be detected.

However, when the transmission is not properly controlled, the signal supplied to the power unit 1 does not coincide with the detection signal. In this state, step 116 is determined to be "NO". The controller 21a detects in step 121 whether or not 3 seconds have elapsed. If NO in step 121, the operations in steps 113 to 121 are repeated until the step 121 is determined to be "YES". When YES in step 121, the alarm signal is generated in step 122. All the electromagnetic valves are turned off in step 123, and predetermined emergency processing is performed.

As is apparent from the above description, the apparatus of the present invention detects that the transmission is controlled in all neutral positions only when the power switch is turned on. The driver is not required to check the neutral position of the transmission, thereby guaranteeing the safe starting operation.

What is claimed is:

1. A transmission remote control apparatus comprising:

a command unit which has a manually operated lever and a plurality of speed shift positions and neutral positions and outputs a command signal in accordance with an actual operation of the manually operated lever by a driver;

a power unit comprising a transmission which has a gear shift lever corresponding to said manually operated lever of said command unit, a plurality of gear shift positions and neutral positions corresponding to said speed shift positions and neutral positions of said command unit, respectively, and moving means for moving said gear shift lever to any one of the gear shift positions through at least one neutral position in accordance with a transmission control signal;

a transmission control unit for receiving the command signal from said command unit to output the actual transmission control signal to said power unit; and a diagnosis unit electrically connected with said power unit for automatically diagnosing whether the gear shift lever is normally shifted in all neutral positions or not while an engine is in stopped condition, by supplying to said moving means of said power unit a signal simulating said actual transmission control signal, said diagnosis unit comprising a controller for outputting a command for controlling the overall diagnostic operation, means for generating the simulated transmission control signal according to the command from said controller, a detecting means associated with said power unit for detecting a current position of said gear shift lever, and means for generating an alarm according to an instruction from said controller;

said controller controlling the diagnostic operation in such manner that, at first, whether the gear shift lever is in any one of the neutral positions or not is checked, if the check result is negative, the alarm being generated from said alarm generating means, and if the check result is affirmative, then, whether the engine is in stopped condition or not is checked, resulting in that, if no, the diagnostic operation is not carried out, but if yes, a neutral position coincidence check with respect to each neutral position is performed, such that said simulated transmission control signal is supplied from said generating means to said power unit to shift said gear shift lever into one neutral position, and at a predetermined time after the simulated transmission control signal is supplied to said power unit, whether the neutral position instructed by the simulated transmission control signal and a current position of said gear shift lever detected by said detecting means coincide with each other or not is checked, resulting in that, if no, the alarm is generated and if yes, the neutral position coincidence check with respect to next neutral position is performed, the neutral position coincidence check being repeated until all neutral positions are completed.

2. A transmission remote control apparatus according to claim 1, wherein said moving means of said power unit comprises two pistons connected with said transmission, two cylinders in which said corresponding pistons are reciprocated, a system for supplying compressed air to said cylinders, and a plurality of electromagnetic valves coupled to said cylinders for controlling the air pressure therein, said electromagnetic valves being connected with said transmission control unit and said simulated transmission control signal generating means to receive said actual and simulated transmission control signals, respectively.

3. An apparatus according to claim 1 further including a power switch for supplying power to said diagnosis unit when said power switch is activated.

4. An apparatus according to claim 3, wherein said diagnosis unit includes means for preventing operation thereof when the vehicle engine is running.

* * * * *